United States Patent [19]

Abrams et al.

[11] Patent Number: 4,623,523

[45] Date of Patent: Nov. 18, 1986

[54] METHOD FOR REDUCTION OF SO₂ EMISSION FOR FOSSIL FIRED BOILER

[75] Inventors: Jack Z. Abrams; Robert M. Sherwin, both of San Rafael, Calif.

[73] Assignee: Bechtel International Corporation, San Francisco, Calif.

[21] Appl. No.: 712,485

[22] Filed: Mar. 18, 1985

Related U.S. Application Data

[63] Continuation-in-part of Ser. No. 474,226, Mar. 11, 1983, abandoned, which is a continuation-in-part of Ser. No. 349,728, Feb. 18, 1982, Pat. No. 4,388,283, which is a continuation-in-part of Ser. No. 181,315, Aug. 25, 1980, abandoned, which is a continuation of Ser. No. 406, Jan. 2, 1979, Pat. No. 4,426,245.

[51] Int. Cl.⁴ .............................................. C01B 17/00
[52] U.S. Cl. ..................................... 423/242; 423/244
[58] Field of Search .......... 423/242 A, 242 R, 244 A, 423/244 R

[56] References Cited

U.S. PATENT DOCUMENTS

| | | | |
|---|---|---|---|
| 2,718,453 | 9/1955 | Beckman | 23/2 |
| 3,904,742 | 9/1975 | Akimoto | 423/554 |
| 3,932,587 | 1/1976 | Grantham et al. | 423/242 |
| 4,046,856 | 9/1977 | Itoo et al. | 423/166 |
| 4,246,245 | 1/1981 | Abrams et al. | 423/242 |
| 4,388,283 | 6/1983 | Abrams et al. | 423/244 |
| 4,452,765 | 6/1984 | Peterson | 423/242 |
| 4,555,996 | 12/1985 | Torbov et al. | 423/242 |

FOREIGN PATENT DOCUMENTS

| | | | |
|---|---|---|---|
| 55-81722 | 6/1980 | Japan | 423/240 |

*Primary Examiner*—Gregory A. Heller
*Attorney, Agent, or Firm*—Townsend & Townsend

[57] ABSTRACT

Apparatus and method for the efficient and economic removal of sulfur dioxide from gases, in which the gas is contacted with neutralizing values obtained from pressure hydrated lime or pressure hydrated dolomitic lime, i.e. calcined limestone or dolomite and slaked with water under elevated temperature and pressure. The pressure hydrated lime or dolomitic lime may be used in conjunction with a wet scrubber, in a spray dryer or dry scrubber, or directly introduced into the gas passages of a boiler, upstream or downstream of the air preheater, or in the boiler output ducting or the inlet of an electrostatic precipitator. The use of pressure hydrated lime or pressure hydrated dolomitic lime greatly enhances the efficiency of sulfur dioxide removal, thereby providing for enhanced use of base values and a more rapid rate of reaction. The confined zone dispersion scheme permits a partial SO₂ removal (10%–50%) without a scrubber, only by atomizing a slurry of pressure hydrated lime or pressure hydrated dolomitic lime into the flue gas duct of the boiler.

13 Claims, 6 Drawing Figures

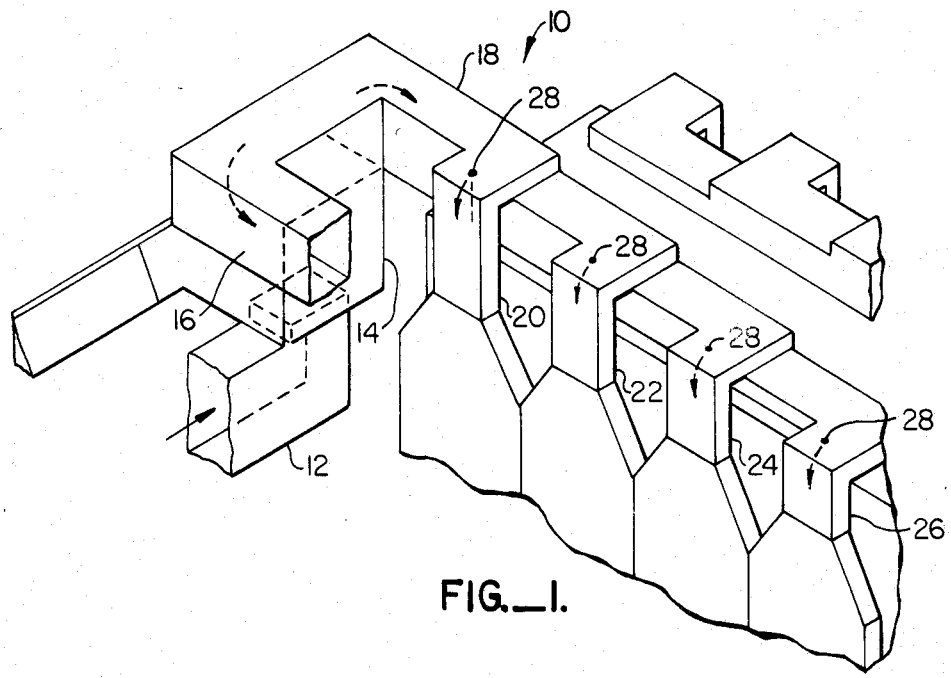
FIG._1.
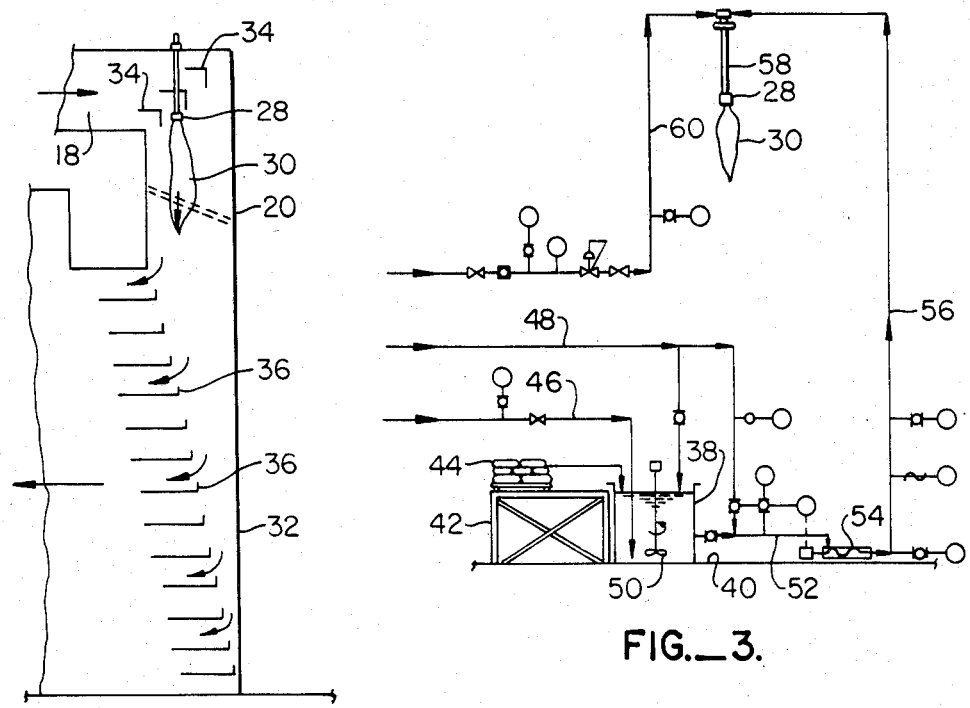
FIG._2.
FIG._3.

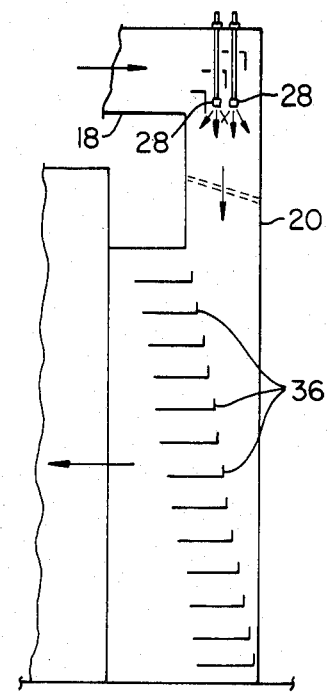
FIG._4.
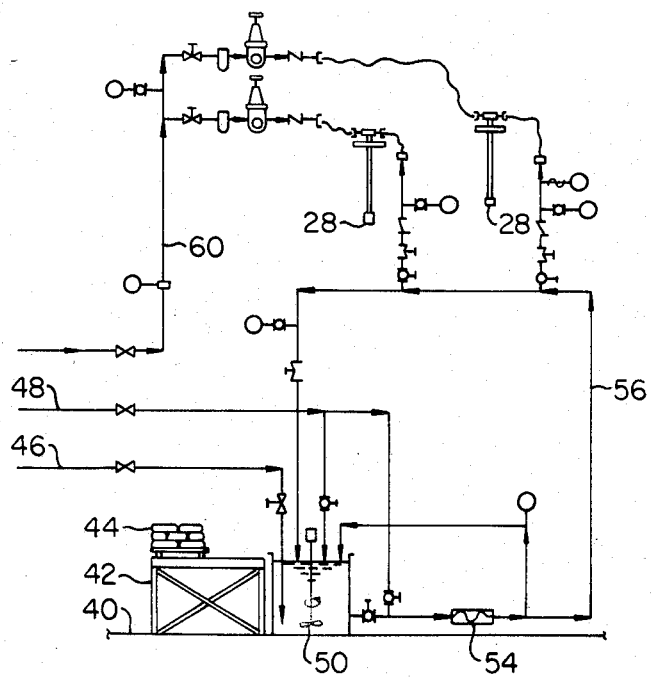
FIG._5.

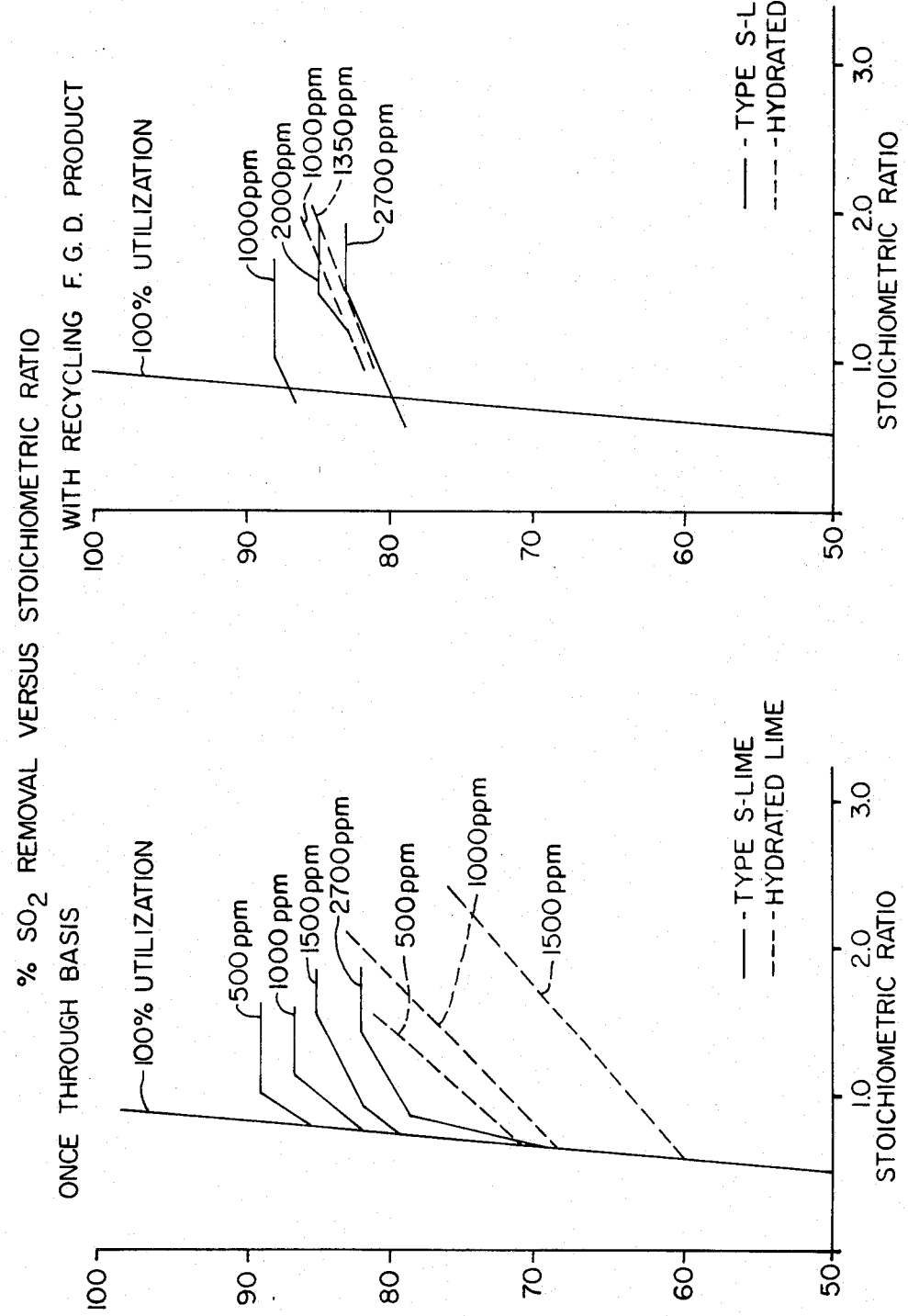
FIG._6.

METHOD FOR REDUCTION OF SO₂ EMISSION FOR FOSSIL FIRED BOILER

This is a continuation-in-part of application Ser. No. 474,226, filed Mar. 11, 1983, now abandoned, which was a continuation-in-part of application Ser. No. 349,728, filed Feb. 18, 1982, now U.S. Pat. No. 4,388,283, the latter application being a continuation-in-part of application Ser. No. 181,315, filed Aug. 25, 1980, now abandoned, the last-mentioned application being a continuation of application Ser. No. 000,406, filed Jan. 2, 1979, now U.S. Pat. No. 4,426,245, all of which disclosures are incorporated herein by reference.

The retrofitting of existing utility boilers with flue gas desulfurization will be a very costly measure for the utilities and their customers. In exploring the alternatives for gross reduction of $SO_2$ overall, it will be the technology with the lowest abatement cost per ton of $SO_2$ reduction which will win out, rather than those solutions which achieve the highest performance in any given application. For example, coal cleaning may be limited to 20–30% reduction, but with a unit cost of $300.00 to $500.00 per ton.

A number of investigators have analyzed the cost of physical coal cleaning, with fuel cost equivalent in the range of 2.5 and 5.0 mils per kilowatt-hour. Coal cleaning may be an ideal answer to reduction in $SO_2$ emissions from 20% to 50%. However, alternatives to coal cleaning may be equally economical and fully effective should coal cleaning prove to be unsatisfactory. These alternatives all involve some form of flue gas desulfurization with the use of additives.

Major criteria to be addressed besides cost are the space requirements and the impact upon particulate removal equipment. Retrofits are almost always cramped for space. The component hardware must either be small or suitable for remote location.

For partial $SO_2$ removal, there are several recognized flue gas desulfurization (FGD) treatments which can be considered. Two of these are applied after the air heater and are (1) partial wet scrubbing, and (2) partial spray-dry. If layout arrangements are not prohibitive, one can make a generalized estimate of the cost of treatment by partial wet scrubbing or by partial spray dry. A third method, namely removal by dry additive injection of 350° F. and lower, has been demonstrated with nahcolite, but not with other readily available, low priced reagents.

Still another technique is bulk injection of powered reagent into the boiler. In contrast to the method of the invention described, there is no attempt to restrict gas mixing. Quite the opposite is true. There is a requirement that the solids be dispersed rapidly and uniformly. Reaction rates, low at ambient temperatures, are multiplied many times by the higher temperatures. The injection of solids into the boiler must not cause fouling or slagging of the boiler tubes, and it must not upset precipitator performance. Apart from these measures, boiler injection offers real promise, depending upon the reagent and the injection location.

The rate of reaction between dilutes, acid gases and dry dispersed alkaline solids is limited by many factors. Among these, besides temperature, are dispersion, diffusion and specific surface. Of particular advantage in dry processing at elevated temperature is the use of reagents which undergo spontaneous size reduction and specific surface enhancement because of their labile water or $CO_2$ content. Nahcolite is one such reagent, decomposing in its pure form at 518° F. Because of its low purity, it is costly to transport. Other soda based materials with similar properties are high in price. Furthermore, their sulfur reaction products are soluble and thereby environmentally mobile. Alkaline earth compounds offer the best prospects in terms of cost and widespread availability, but they vary widely in their reaction rates.

Particulate removal requirements must be kept in mind. Most retrofits involve older precipitators whose performance may not match current regulations; thus, they may have to be upgraded.

In view of the foregoing, a need exists for improvements in the removal of $SO_2$ emissions from flue gases so that such desulfurization can be achieved efficiently at minimum costs and with minimum changes to existing structures with which the desulfurization technique is applied. The present invention satisfies this need as hereinafter described.

DESCRIPTION OF THE PRIOR ART

Type S or pressure hydrated dolomitic lime, which is prepared from calcined dolomite, is available as a structural material from Flintkote Lime Products. A description of the preparation of Type S hydrated lime may be found in Boynton, *Chemistry and Technology of Lime and Limestone*, Interscience Publishers, New York, 1965, pages 167, 288–9, 302–307, 317–318, and 333–338. In Boynton, Type S hydrated lime is described only for structural purposes for use in a plaster-type application. However, nothing is suggested in Boynton that such Type S hydrated lime is suitable for use in reduction of $SO_2$ emissions.

U.S. Pat. No. 4,046,856 describes a sulfur dioxide removal process using magnesium with recycling of the magnesium as magnesium hydroxide. Other patents of interest describing the processing of flue gases with basic materials include U.S. Pat. Nos. 2,068,882, 3,883,639, 3,941,378, 3,919,393, 3,991,172, 4,011,299 and 4,018,868. Other references include C.A. 81; 6803u, 82; 6399r, 82; 174821b, 84; 155093r, 84; 155095t and German Offen. No. 2412372.

SUMMARY OF THE INVENTION

The present invention is directed to a method of removing $SO_2$ from flue gases using a confined zone dispersion (CZD) technique with pressure hydrated lime or pressure hydrated dolomitic lime as a economical option for partial $SO_2$ reduction to, for instance, 20%–50% removal. In this post combustion treatment concept, pressure hydrated lime or pressure hydrated dolomitic lime in slurry form is simply sprayed in a confined zone into the duct work downstream of the boiler or the air heater and ahead of the precipitator where it acts as a sulfur dioxide scavenger. In the CZD technique, unlike conventional spray-dry systems, slurry is injected into the center of a flue gas duct or equipment gas passageway so that the droplet flow space is confined, not by vessel walls, but by the boundary slip stream layer of untreated flue gas. The warmer boundary layer bypasses the core zone of adiabatically cooled and desulfurized flue gas. Bulk mixing of the two are suppressed by the choice of geometric spray and duct configuration. The cooled core zone provides a high reactivity environment at temperatures close to adiabatic. Residence time is brief, as low as one second or less.

At flue gas entry temperatures in the range of 250° F. to 350° F., most dry compounds are relatively inert, and the presence of water to dissolve and facilitate mass transfer of both the alkali reagent and the $SO_2$ is essential for rapid desulfurization. Injected slurries of limestone and dolomite are quite unreactive. Slurries of conventional slaked lime are somewhat more reactive but atomization and feed control devices are undependable. Upsets may lead to solids build-up in the duct with gas flow restriction or structure collapse. Soda ash solutions are reactive but costly and are subject to leaching from the waste product.

Slurries of pressure hydrated dolomitic lime, which is porous and has a very high specific surface, are more reactive than those of regular slaked lime. Such slurries have superior atomization and feed control characteristics and offer a promising means for confined zone dispersion.

The use of this highly reactive pressure hydrated lime or pressure hydrated dolomitic lime can also improve the performance of spray-dry FGD systems since, in addition to the more reactive chemistry, the economical production of much smaller solid particles also allows the use of much smaller spray droplets with increased surface area and decrease retention times. The smaller particles also exhibit less viscous properties, allowing greater slurry loadings and the use of less water in the spray. This, in turn, allows a greater amount of sulfur removal or allows a greater degree of safety with respect to the prevention of reaching the dew point.

Dispersion can be carried out typically by an air atomizing nozzle of the external mixing type. Steam may also be used in which case a portion of the total energy requirement for atomization is provided by low grade thermal energy rather than higher grade mechanical energy, as evidenced by the substantial decrease in slurry viscosity with increasing slurry temperature. Mechanical rotary nozzles or other advanced low energy supersonic devices for atomization are also suitable for dispersion purposes.

The high reactivity of pressure hydrated lime or pressure hydrated dolomitic lime means a low consumption of this reagent, and thereby it is expected that the existing precipitators will not be affected.

The present invention is primarily directed by the superior reactivity of pressure hydrated lime or pressure hydrated dolomitic lime which leads to more effective $SO_2$ removal than the ordinary lime. Moreover, this result can be accomplished with less residence time and thereby smaller equipment. The confined zone dispersion (CZD) concept is a further extension of the spray-dry principal wherein the user accepts limited performance in return for reduced capital and operating costs. This results in the lowest possible abatement cost per ton of sulfur removal.

The concept of the present invention is called confined zone dispersion because it intentionally confines the reaction zone to the center of the duct. Thus, $SO_2$ removal occurs in a narrow zone in the center of the flue gas channel with intentional bypassing of an $SO_2$ contaminated slip zone surrounding the confined zone. This occurs as the spray cools the central flue gas, causing it to contract and encouraging gas slippage around the confined zone.

The pressure hydrated lime or pressure hydrated dolomitic lime can be applied in slurry form at any one of a number of different locations in a boiler system. It can be used with a wet scrubber, in a spray dryer or dry scrubber, or directly introduced into the gas passages of a boiler, upstream or downstream of the air preheater for the boiler, or in the boiler output ducting or in the inlet of an electrostatic precipitator.

OBJECTIVE

The primary object of the present invention is to provide an improved method for the efficient and economic removal of sulfur dioxide from flue gases wherein the flue gases are contacted in a confined zone by a slurry containing pressure hydrated lime or pressure hydrated dolomitic lime to enhance the efficiency of sulfur dioxide removal from the flue gas at a rapid rate of reaction in a confined zone dispersion scheme.

Other objects of this invention will become apparent as the following specification progresses, reference being had to the accompanying drawings for illustrations of several embodiments of the apparatus for carrying out the method of the present invention.

IN THE DRAWINGS:

FIG. 1 is a fragmentary perspective view of the electrostatic inlet duct of a boiler outlet using the confined zone dispersion technique of the present invention;

FIG. 2 is a fragmentary, schematic view of the apparatus of FIG. 1 showing the location of the confined zone in which a slurry is dispersed for reduction of $SO_2$ emissions in flue gases;

FIG. 3 is a schematic view of the fluid circuitry associated with the apparatus of FIGS. 1 and 2;

FIGS. 4 and 5 are views similar to FIGS. 2 and 3 but showing the apparatus having a plurality of slurry spray nozzles in the flue gas duct upstream of an electrostatic precipitator; and FIG. 6 is a graphic view of certain test results obtained from the practice of the method of the present invention.

To illustrate the details of the present invention, an outlet duct system associated with a boiler is shown in FIG. 1, the duct system being broadly denoted by the numeral 10. System 10 includes a first duct 12 which carries flue gas from the air preheaters of the boiler, the flue gases rising in a second duct 14 and into side ducts 16 and 18 of substantially identical construction. The flue gases flow then into downwardly extending ducts 20, 22, 24 and 26, as shown in FIG. 1 as being coupled to duct 18. A nozzle 28 is located in each of ducts 20, 22, 24 and 26 for injection of a slurry of pressure hydrated lime or pressure hydrated dolomitic lime into the flue gases into a confined zone 30 of the shape shown in FIG. 2. Zone 30 is elongated and extends from nozzle 28 into the corresponding duct toward the lower end thereof, the ducts 20, 22, 24 and 26 being at the upper end of the electrostatic precipitator 32. Turning vanes 34 and 36 are located at the upper and lower ends of each duct 20 for directing the flue gases in desired directions.

FIG. 3 shows the way in which the slurry of pressure hydrated lime or pressure hydrated dolomitic lime is made. For instance, a slurry preparation tank 38 is mounted on floor 40 adjacent to a loading platform 42 on which sacks 44 of pressure hydrated lime or pressure hydrated dolomitic lime are supported. The contents of the sacks 44 are emptied into tank 38, along with low pressure steam from line 46 and process water from line 48, both lines 46 and 48 emptying into tank 38 which has an agitator 50 therein.

The slurry exits from tank 38 along a line 52 through a slurry spray feed pump 54 and then along a line 56 to the pipe 58 coupled to nozzle 28 where the slurry is injected, sometimes with process plant air directed along line 60 under pressure.

The location of zone 30 has been selected so that $SO_2$ removal is confined to the center of the flue gas duct 20 while intentionally bypassing an $SO_2$ contaminated slip zone surrounding zone 30. The formation of zone 30 occurs as the slurry spray cools the central flue gas, causing it to contract and encouraging gas slippage around the confined zone 30. In this way, no wet deposits can form on the internal wall surfaces of duct 20. While only a single duct 20 of duct 18 is shown with a single nozzle 28, it is to be understood that the other ducts 22, 24 and 26 can be provided with nozzles 28, and that additional nozzles can be installed in any duct, either in parallel or series so long as they leave a slip flow of flue gas surrounding their collective spray zones.

FIG. 2 shows the relative location of confined zone 30 in duct 20. The duct is completely straight with no baffles and has a typical length of 51 feet 7 inches. This is an ideal length because, at a gas velocity of 50 feet per second, it takes about one second for slurry droplets to dry in duct 20. FIG. 3 shows typically the required instrumentation for control of $SO_2$ removal by the confined zone dispersion method using single nozzles 28 in ducts 20, 22, 24 and 26. FIGS. 4 and 5 are views similar to FIGS. 2 and 3, except that in each of ducts 20, 22, 24 and 26, there are at least two nozzles **28*a* instead of a single nozzle, the nozzles 28*a* being side by side and at the same height and location in the corresponding flue gas duct, all other aspects of FIGS. 4 and 5 being the same as those of FIGS. 2 and 3**.

EXPERIMENTAL RESULTS

The confined zone dispersion concept has been demonstrated in a test using a small (400 acfm) spray-dry test rig using simulated flue gas (without ash) at 311° F. using both a normal hydrated lime and a pressure hydrated dolomitic lime. The residence time was only 3.3 seconds compared to 10 seconds or greater for most conventional spray duct dry designs. The system was operated both with a rotary nozzle and a dual fluid (air-slurry) injection.

Pressure hydrated dolomitic lime is calcined dolomite hydrated under conditions of elevated temperatures and pressures. As provided by Flintkote, pressure hydrated dolomitic lime has a calcium hydroxide content of about 55%, magnesium hydroxide content of about 40%, magnesium oxide content of about 2%, and water of about 0.2%. The settling rate to one-half volume in minutes (ASTM C-110) is about 225, while the specific gravity is 2.24. The sieve analysis shows 100% of the particles passed 20 mesh while 79% of the particles passed 325 mesh. As decribed in *Chemistry and Technology of Lime and Limestone*, page 336, pressure hydrated dolomitic lime is hydrated in an autoclave at pressures of from 25 to 150 psi and temperatures of from about 250° F. to 400° F.

The results of the test, shown in FIG. 6, clearly show the superiority of pressure hydrated lime or pressure hydrated dolomitic lime in $SO_2$ removal. However, the test results also show that only a negligible amount of $SO_2$ removal occurred on the downstream bag filter and that essentially complete $SO_2$ removal occurred in the short residence time reactor. The flattening of the curves of FIG. 6 with increasing stoichiometry suggests that the unremoved $SO_2$ bypassed the spray zone, in turn suggesting that the effective reaction rate was complete in less than a 3.3 second residence time. From this it may be extrapolated that the required residence time for 30% to 50% $SO_2$ removal should be of the order of one second.

The reaction time can be reduced to only one second for about 50% removal of $SO_2$ by varying the approach to saturation, by reducing the droplet size of the atomized slurry, and by confining the wet core inside the hot flue gas in duct 20, for instance. With a gas velocity of 50 to 60 feet per second in the outlet duct, it is expected that the complete reaction of $SO_2$ absorption and drying of the reaction product to take place in about one second for a length of about 50 to 60 feet for the duct. Normally this length of straight duct is available in existing power plants.

In the method of the present invention, a sulfur dioxide-containing gas is contacted with pressure hydrated lime or pressure hydrated dolomitic lime to reduce the level of sulfur dioxide in flue gases to substantially less than about 7%-10% of the original level, preferably less than about 70 ppm, more usually to a value below 55 ppm. Usually solids content in the slurry of the present invention will be about 5 weight percent solid, or can be in the range of 10 weight percent to 40 weight percent, and generally not more than about 80 weight percent.

The mechanism for producing the spray may employ any of several principles such as mechanical rotary or piezoelectric driven atomizers, single fluid (slurry) atomizers or dual fluid (air/slurry or steam/slurry) atomizers. However it is done, it is desirable to make use of the very small Type S solid particle size, typically less than 40 microns, to make very small droplets having a high surface area for rapid dissolution of the $SO_2$ in the flue gas. A specific method of performing this operation, with minimum energy consumption, is with the use of preheating and/or steam atomization since this lowers the viscosity and requires less pumping energy for the same degree of atomization. This decreasing viscosity versus increasing temperature is shown in the following table.

Viscosity Variation
With Type of Lime Slurry, Percent Solids
And Slurry Temperature

| | % SOLIDS | TEMP. C | VISCOSITY C.P. |
|---|---|---|---|
| Hydrated Lime | 30 | 23 | 49.3 |
| | 37 | 23 | 749.0 |
| Pressure Hydrated Dolomitic Lime | 30 | 23 | 37.8 |
| | 30 | 82 | 23.3 |
| | 37 | 23 | 114.0 |

The slurry will be introduced into zone 30 at a greater than stoichiometric ratio generally from about 1.1 to 1.5 mole ratio, more usually from about 1.2 to 1.4 mole ratio. With the effluent from low sulfur coal, the stoichiometry will generally be about 1.4 while with high sulfur coal, the mole ratio will generally be about 1.1 to 1.2.

Because of the dependence of spray absorption FGD reactions on water, the stages of reaction using the slurry of the present invention are intimately linked to the classical stages of solids drying as follows:

1. The warmup;
2. The constant rate; and
3. The two falling rate periods.

The first stage of reaction occurs in the flue gas duct during the warmup and constant rate drying period where the drying period is controlled by heat transfer to the droplets and water vapor diffuses from the saturated droplet surface. The liquid is saturated with calcium hydroxide and magnesium hydroxide and the pH is high so that the reaction rate is controlled by the diffusion of sulfur dioxide and carbon dioxide into the droplet which tends to be impeded by the counter diffusion of water vapor.

In the constant rate period, the factors influencing sulfur dioxide removal are those that affect the diffusion of sulfur dioxide into the droplets. Effective mixing of the droplets in the gas stream, high humidity to lengthen evaporation time and a high sorbent flow rate atomized finally enough to promote mass transfer will all contribute to increased performance.

The second reaction stage also occurs within the flue gas duct during the two falling rate periods and is far more complex than the first. Depletion of moisture from the droplets has brought the sorbent particles closer together and significant dissolution of sulfur dioxide as well as soluble magnesium sulfite-sulfate and precipitation of calcium salts from solution has lowered the pH and brought the dissolution of fresh magnesium hydroxide and calcium hydroxide into play. The soluble magnesium sulfite is a fast absorbent of sulfur dioxide and solution, producing magnesium bisulfite which reacts with the fresh magnesium hydroxide to produce more soluble magnesium sulfite.

The sub-micron particles of calcium hydroxide which is a part of the pressure hydrated lime or pressure hydrated dolomitic lime reacts with sulfur dioxide in solutions, producing reacting product of low solubility which progressively clogs the calcium hydroxide particles with crystalline precipitate.

With the onset of the second falling rate period, mass transfer is restricted to interstices between adjacent sorbent particles. Eventually, evaporation virtually ceases and the "dry" agglomerations of sorbent particles leave the flue gas duct with an equilibrium moisture content.

The factors which promote sulfur dioxide removal for the constant rate period also are beneficial during the falling rate period. Because the dissolution of regular calcium hydroxide is a rate-limiting factor for the falling rate period, it is helpful to have a pressure hydrated lime or pressure hydrated dolomitic lime, whereby extremely fine (sub-micron) porous particles of sorbent (calcium hydroxide and magnesium hydroxide) are present in the sorbent slurry.

Economics

Conceptual capital and operating costs for partial wet scrubbing, partial spray-dry treatment and confined zone dispersion (CZD), the present invention, have been estimated. These are drawn principally from the 1980 publication of Electric Power Research Institute entitled "Economic and Design Factors for FGD Technology." Confined zone dispersion (CZD) clearly shows the advantage of its low capital investment and that 1-2 mils per kilowatt-hour is far more attractive than the two alternatives listed, namely 5.14 mils per kilowatt-hour for 20% partial $SO_2$ removal by wet scrubber and 4.17 mils per kilowatt-hour for 20% partial $SO_2$ removal by spray-dry.

Among the inherent advantages of the CZD technique versus other processes of partial $SO_2$ reduction include the following:

1. Lowest capital and operating costs;
2. Lowest space requirement in the boiler area;
3. CZD does not affect slagging and fouling of the boiler; and
4. CZD can control $SO_2$ emission from low or high sulfur coal.

Conclusions

Based upon the results of the present method, the use of pressure hydrated lime or pressure hydrated dolomitic lime provides a highly efficient and economical process for the removal of sulfur oxides from the burning of both high and low sulfur containing fuel. The efficiency is achieved at moderate stoichiometric ratios without requiring recycling of partially spent particles. At a stoichiometric ratio of 1.2 to 1.5, pressure hydrated lime or pressure hydrated dolomitic lime is far superior to any other type of lime for removal of $SO_2$ from flue gas, regardless of the sulfur dioxide concentration in the inlet flue gas. The high performance of sulfur dioxide removal at low stoichiometric ratios can be accomplished at a higher approach to adiabatic saturation, thereby avoiding the requirements of flue gas bypassing for reheating and limiting the risk of particle build-up and clogging in the spray dryer.

The very fine porous particles of pressure hydrated lime or pressure hydrated dolomitic lime in the feed slurry expose a very large surface area for reaction with efficient diffusion of sulfur dioxide into the droplets and efficient use of the neutralizing values which are present in the slurry. A finer atomization is achieved with pressure hydrated lime or pressure hydrated dolomitic lime, thereby providing faster reaction and shorter residence times, so that equipment size can be reduced as compared with the use of other types of lime for reduction of sulfur oxides. Furthermore, because of the high efficiency in the use of neutralizing values in a single pass of the slurry through the flue gas, no recycling of the FGD product is required. This avoids the problems of abrasion resulting from the fly ash which is present in the recycle product, as well as the additional equipment associated with the recycling of the FGD product. It is evident from the foregoing that pressure hydrated lime or pressure hydrated dolomitic lime provides numerous efficiencies and advantages in the removal of sulfur dioxide from flue gases.

What is claimed is:

1. A method for removing sulfur dioxide from a sulfur dioxide-containing flue gas comprising:
   injecting small particles of an aqueous dispersion of material selected from the group consisting of pressure hydrated lime and pressure hydrated dolomitic lime into a confined zone within a flue gas stream flowing in a duct in an amount sufficiently large to reduce the sulfur dioxide content of said flue gas to a level equivalent to between 10% and 90% of the original sulfur dioxide content but sufficiently small so that the aqueous dispersion is completely dried within within the confined zone, in a stoichiometric ratio to said sulfur dioxide of not larger than 1.5, wherein said confined zone is spaced-apart from the inside walls of the duct and completely dry.

2. A method as set forth in claim 1, wherein said gas is contacted with the material dispersion in the boiler outlet ducting of a boiler.

3. A method as set forth in claim 1, wherein said gas is contacted with the material dispersion in the inlet of an electrostatic precipitator.

4. A method as set forth in claim 1, wherein said confined zone is defined by a surrounding slip zone of the flue gas in the flue duct.

5. A method as set forth in claim 1, wherein the aqueous dispersion has at least about five weight percent solids.

6. A method as set forth in claim 1, wherein said aqueous dispersion is atomized with a rotary atomizer.

7. A method as set forth in claim 1, wherein the aqueous dispersion is atomized with a piezo-electric driven nozzle.

8. A method as set forth in claim 1, wherein the aqueous dispersion is atomized in successive places in the flue gas stream.

9. A method as set forth in claim 1, wherein the aqueous dispersion is atomized with a pressurized gas.

10. A method as set forth in claim 9, wherein said gas is compressed air.

11. A method for removing sulfur dioxide from a sulfur dioxide-containing flue gas stream flowing within a duct, said method comprising axially spraying an aqueous slurry of a sulfur-dioxide scavenger selected from the group consisting of pressure hydrated lime and pressure hydrated dolomitic lime near the center of the duct so that absorption occurs and the aqueous slurry is completely dried within a confined dispersion zone spaced apart from the inside walls of the duct.

12. A method as in claim 11, wherein the stoichiometric ratio of scavenger to sulfur dioxide is in the range from 1.0 to 1.5.

13. A method as in claim 11, wherein the duct is an inlet to an electrostatic precipitator.

* * * * *